(12) United States Patent
Kanter et al.

(10) Patent No.: US 9,747,801 B2
(45) Date of Patent: Aug. 29, 2017

(54) METHOD AND DEVICE FOR DETERMINING SURROUNDINGS

(71) Applicant: Robert Bosch GmbH, Stuttgart (DE)

(72) Inventors: Pascal Kanter, Renningen (DE); Thomas App, Bretten (DE)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 14/397,820

(22) PCT Filed: Apr. 15, 2013

(86) PCT No.: PCT/EP2013/057767
§ 371 (c)(1),
(2) Date: Oct. 29, 2014

(87) PCT Pub. No.: WO2013/164182
PCT Pub. Date: Nov. 7, 2013

(65) Prior Publication Data
US 2015/0116101 A1    Apr. 30, 2015

(30) Foreign Application Priority Data
Apr. 30, 2012   (DE) .................. 10 2012 207 203

(51) Int. Cl.
| | |
|---|---|
| *G06F 7/00* | (2006.01) |
| *G06K 9/00* | (2006.01) |
| *G08G 1/16* | (2006.01) |
| *G06N 7/00* | (2006.01) |
| *H04N 7/18* | (2006.01) |
| *B60W 40/06* | (2012.01) |

(52) U.S. Cl.
CPC ............. *G08G 1/165* (2013.01); *G06N 7/005* (2013.01); *G08G 1/16* (2013.01); *G08G 1/167* (2013.01); *H04N 7/183* (2013.01); *B60W 40/06* (2013.01)

(58) Field of Classification Search
USPC .............................. 701/36; 382/103
See application file for complete search history.

(56) References Cited

U.S. PATENT DOCUMENTS

| | | | | |
|---|---|---|---|---|
| 5,961,571 A | * | 10/1999 | Gorr ................ | G01S 3/783 340/988 |
| 7,639,841 B2 | * | 12/2009 | Zhu .................... | G06K 9/00335 340/435 |
| 9,344,683 B1 | * | 5/2016 | Nemat-Nasser ........ | B60R 11/04 |
| 2006/0177099 A1 | * | 8/2006 | Zhu .................... | G06K 9/00335 382/104 |

(Continued)

OTHER PUBLICATIONS

International Search Report for PCT/EP2013/057767, dated Feb. 6, 2014.

(Continued)

*Primary Examiner* — Tyler Paige
(74) *Attorney, Agent, or Firm* — Norton Rose Fulbright US LLP; Gerard Messina

(57) ABSTRACT

A method for classifying surroundings of a motor vehicle includes: providing a hypothesis regarding the class to which the surroundings belong; sampling pieces of information from the surroundings of the motor vehicle; determining a criterion which supports or weakens the hypothesis based on the sampled pieces of information; and determining a probability of the hypothesis being correct, using the criterion with the aid of Bayesian filtering.

22 Claims, 3 Drawing Sheets

(56) References Cited

U.S. PATENT DOCUMENTS

| | | | | |
|---|---|---|---|---|
| 2008/0004793 A1* | 1/2008 | Horvitz | ............... | H04W 4/027 |
| | | | | 701/487 |
| 2008/0056535 A1* | 3/2008 | Bergmann | ............. | G01C 21/30 |
| | | | | 382/103 |
| 2009/0103779 A1* | 4/2009 | Loehlein | ............ | G06K 9/00369 |
| | | | | 382/103 |
| 2009/0296989 A1* | 12/2009 | Ramesh | ............ | G06K 9/00771 |
| | | | | 382/103 |
| 2012/0299766 A1* | 11/2012 | Mizutani | ................ | G01S 13/42 |
| | | | | 342/118 |
| 2013/0116859 A1* | 5/2013 | Ihlenburg | ................ | G06F 17/00 |
| | | | | 701/2 |
| 2015/0116101 A1* | 4/2015 | Kanter | .................. | G06N 7/005 |
| | | | | 340/435 |

OTHER PUBLICATIONS

Qing et al., "Real-Time Lane Departure Detection Based on Extended /Edge-Linking Algorithm", Computer Research and Development, 2010, Second International Conference, IEEE, May 7, 2010, pp. 725-730.

Pangop et al., "Feature-based Multisensor Fusion Using Bayes Formula for Pedestrian Classification in Outdoor Environments", Intelligent Vehicles Symposium, IEEE, Jun. 30, 2007, pp. 62-67.

Rybski et al., "Handling Diverse Information Sources: Prioritized Multi-Hypothesis World Modeling", CMU-CS-06-182, Dec. 1, 2006.

Blackman, "Multiple hypothesis tracking for multiple target tracking", IEEE Aerospace and Electronic System Magazine, IEEE Service Center, Bd. 19, No. 1, Jan. 31, 2004, pp. 5-18.

\* cited by examiner

METHOD AND DEVICE FOR DETERMINING SURROUNDINGS

BACKGROUND OF THE INVENTION

1. Field of the Invention

The present invention relates to a technique for determining surroundings of a motor vehicle, and particularly relates to a classification of the surroundings based on locally sampled information.

2. Description of the Related Art

A plurality of support systems for the driver may be installed on board a motor vehicle, which systems are referred to as assistance systems. Such a system may include, for example, a lane assistant (lane departure warning system) which issues a warning when the motor vehicle is about to leave a marked lane on a road. A further assistance system may include a parking assist system which provides steering or driving instructions for a parking process.

For such assistance systems to function, it is advantageous to know in what surroundings or on what type of road the motor vehicle is presently situated. For example, if the lane assistant has the information available that the motor vehicle is on a freeway, certain functions may be adapted thereto and parameterized. Visual references to a traffic lane may thus be evaluated in a more targeted manner, for example.

Known assistance systems determine a position of the motor vehicle and infer the surroundings based on map data at the particular position. However, not every motor vehicle is equipped with a navigation system or a map database, and moreover the map database may be outdated and thus result in misinformation. Another approach provides for determining the surroundings at least approximately based on the present speed of the motor vehicle. For example, starting at a driving speed of approximately 130 km/h, it may be assumed that the motor vehicle is situated on a freeway. However, such a determination is prone to errors and may even work against the functional capability of the assistance systems at some points.

It is therefore the object of the present invention to provide a method, a computer program product, and a device for the improved classification of the surroundings of a motor vehicle.

BRIEF SUMMARY OF THE INVENTION

A method according to the present invention for classifying surroundings of a motor vehicle includes steps of providing a hypothesis regarding the class to which the surroundings belong, sampling pieces of information from the surroundings of the motor vehicle, and determining, based on the sampled pieces of information, a criterion which supports or weakens the hypothesis. A probability of the hypothesis being correct is then determined from the criterion with the aid of Bayesian filtering.

By processing locally available pieces of information, the actual surroundings of the motor vehicle may be determined without resorting to a database and the risks of incorrect entries associated therewith. Moreover, by providing a gradual probability instead of a binary statement, a driver assistance method downstream from the method may attach more or less importance to the determination. In this way, contradictions between different pieces of information may be resolved more easily, if necessary. In addition, the Bayes filter may be used in such a way that past estimations which were identified as being correct or incorrect contribute to improving the accuracy. Erroneous rejection or erroneous acceptance of the hypothesis may thus become less frequent or less likely without further action.

The hypothesis is preferably accepted if the probability exceeds an upper threshold value, and it is preferably rejected if the probability drops below a lower threshold value, the threshold values having a predetermined distance from each other.

In this way, a driver assistance system which is not prepared to operate with probabilities may also benefit from the method. Moreover, the determined surroundings may be displayed to the driver of the motor vehicle for the purpose of checking or confirming or disagreeing. Additionally, a function may be degraded with respect to the given probability, or the function may adapt internal parameters or thresholds based on the given probability.

In one preferred specific embodiment, a plurality of certain criteria is stored, the probability being determined based on the stored criteria. In this way, it is possible to carry out the statistical evaluation of the Bayes filter on a broader basis of input parameters. The accuracy of the filter may thus increase.

Each criterion may relate to a point in time, and the criteria may be cyclically stored based on their reference points in time, so that the probability is always determined with respect to a predetermined, past time period. The determination may thus evaluate, in the manner of a moving average, past pieces of information which are within an interval considered to be relevant for the determination of the present surroundings.

The number of stored criteria may be variable, for example based on a speed of the motor vehicle. A transition between different surroundings of the motor vehicle is possible more quickly in this way as a result of the method.

In one further preferred specific embodiment, a first weighting factor is assigned to each criterion. For example, a first criterion may represent transverse dynamics of the motor vehicle, while a second criterion is assigned to a driving speed of the motor vehicle. During the determination as to whether the surroundings of the motor vehicle is in the class of freeways, the weighting factor for the first criterion may be greater than the weighting factor of the second criterion. The relevance of the different criteria for the determination of the probability regarding the applicable hypothesis may thus be modeled. Both the accuracy and the determination speed of the classification of the surroundings may thus be improved.

In one further preferred specific embodiment, the determination of the criterion includes a weighting with an uncertainty factor which increases as the latest determined probability increasingly moves away from the extreme values. In other words, the criterion is multiplied with a further factor which reduces the influence of the criterion on the determined probability if the latest determined probability was within the range of acceptance (near 1) or within the range of rejection (near 0) of the hypothesis. In this way, the method tends to converge more quickly, i.e., to determine a value that differs preferably drastically from the probability of 50%. The further removed the determined probability is from 50%, the lower is the influence of a newly determined criterion on the probability to be newly determined, so that the acceptance or rejection of the hypothesis may be stable even with briefly changed pieces of information, for example, in the form of a measuring error or an outlier. In this way, for example, a temporary situation such as a traversing of a tunnel or a passing maneuver may leave the determination or classification of the surroundings unaffected.

A computer program product includes program code means for carrying out the described method when the computer program product runs on a processing device or is stored on a computer-readable data carrier.

A device according to the present invention for classifying the surroundings of a motor vehicle includes an estimating device for providing a hypothesis regarding the class to which the surroundings belong, an interface for receiving pieces of information sampled from the surroundings of the motor vehicle, and a processing device for determining a criterion which supports or weakens the hypothesis, based on the sampled pieces of information, and for determining a probability of the hypothesis being correct with the aid of Bayesian filtering of the criterion. In one preferred specific embodiment, the device is configured to put forward and check a number of different hypotheses in order to determine which class the surroundings are most likely assignable to.

The device may be situated on board the motor vehicle and configured to make a signal indicating the surroundings of the motor vehicle available to one or multiple driver assistance systems of the motor vehicle.

In one preferred specific embodiment, the device additionally includes a circular buffer for storing a predetermined number of certain criteria, the Bayesian filtering taking place based on the stored criteria.

DETAILED DESCRIPTION OF THE INVENTION

Figure 1:
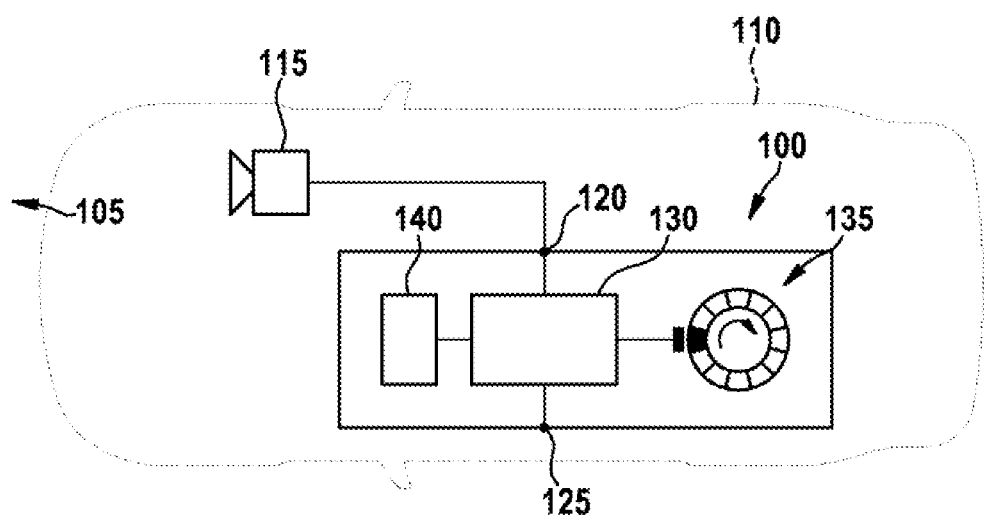
FIG. 1 shows a device for classifying surroundings of a motor vehicle.

FIG. 1 shows a device 100 for classifying surroundings 105 of a motor vehicle 110. Device 100 is situated on board motor vehicle 110 and is configured to determine surroundings 105 or to carry out a classification as to whether surroundings 105 fall into a predetermined class. Such classes may include, for example, a freeway, a traffic-calmed zone, city traffic or a parking situation.

A sampling device 115, which is configured to sample surroundings 105 of motor vehicle 110, is provided on board motor vehicle 110. In the present illustration, sampling device 115 includes a camera for recording still or moving images. In further specific embodiments, it is also possible to provide multiple and/or other sampling devices 115, such as a distance sensor or a position sensor. Sampling device 115 does not have to be included in device 100, but may also be assigned to a subsystem of motor vehicle 110, the provided pieces of information also being used by device 100.

Device 100 includes a first interface 120 for receiving the pieces of information of sampling device 115, a second interface 125 for providing a signal indicating the class of surroundings 105, and a processing device 130 which is connected to the two interfaces 120, 125.

For efficient implementation, preferably a circular buffer 135 may additionally be provided, which is connected to processing device 130 and allows cyclic storage of a predetermined number of elements, a writing of a new element including a removal of the oldest element from circular buffer 135 when circular buffer 135 is full. In one preferred specific embodiment, the read access to the elements of circular buffer 135 may take place optionally. The number of elements of circular buffer 135 may be variable and may be varied, for example, based on a driving speed or another operating parameter of motor vehicle 110.

Circular buffer 135 generally has a fixed size of n memory locations, whereby it is also usable on a control unit without dynamic memory management. A moving average ("running mean") is very easy and efficient to implement via the content of circular buffer 135.

Moreover, a rule base 140 is optionally provided, in which parameters and constants corresponding to different classes of surroundings 105 may be stored. To determine whether surroundings 105 of motor vehicle 110 fall into a predetermined class, the parameters corresponding to this class may be read and, if necessary, also be written by processing device 130.

Figure 2:
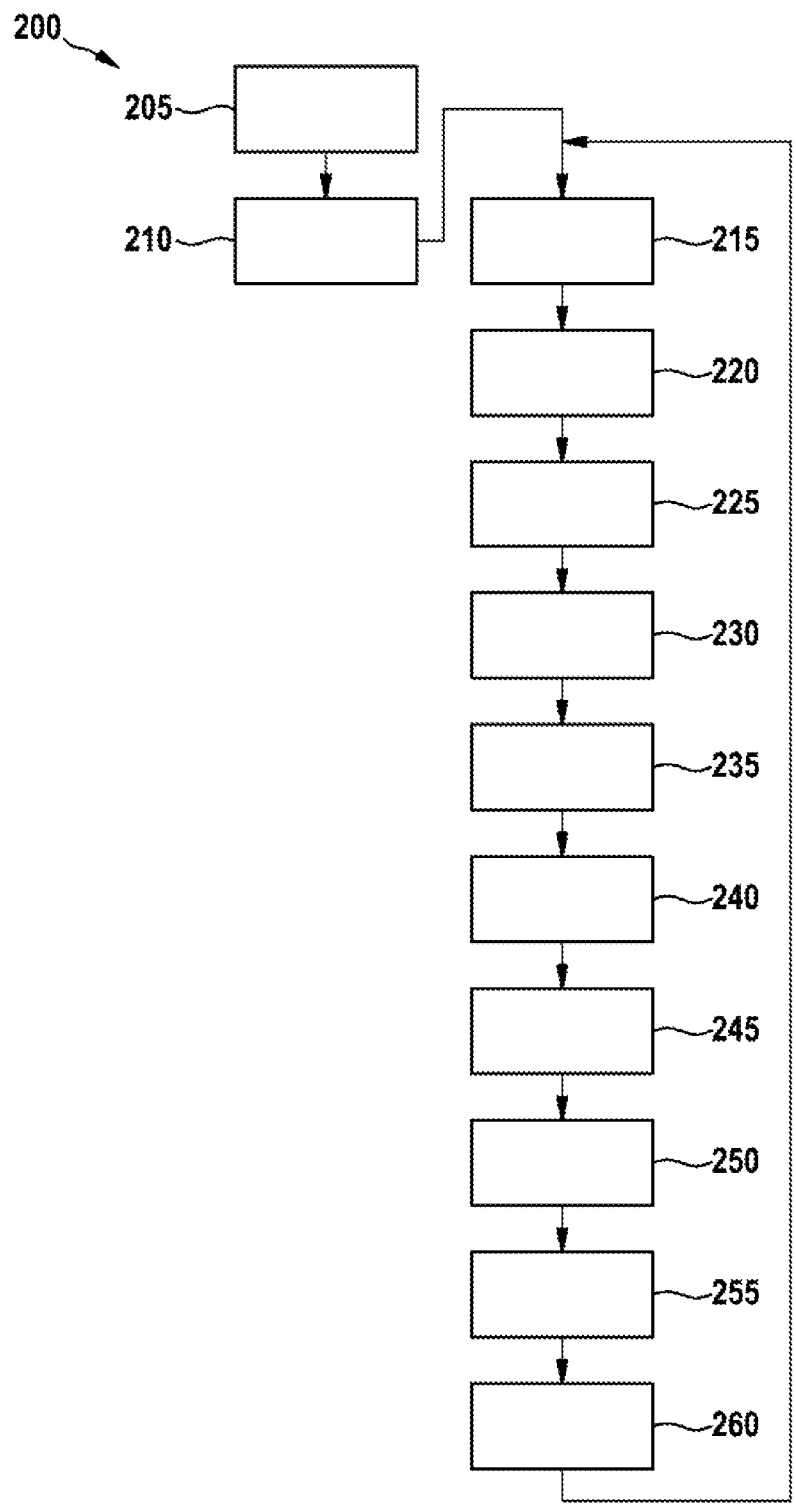
FIG. 2 shows a flow chart of a method.

FIG. 2 shows a flow chart of a method 200 for classifying the surroundings of motor vehicle 110 of FIG. 1. Method 200 is in particular configured to take place on processing device 130 of device 100 on board motor vehicle 110 in FIG. 1. In particular, method 200 may be designed in the form of a computer program product for controlling a programmable microcomputer. The purpose of method 200 is to determine the class of surroundings 105, or to determine whether surroundings 105 fall into a predetermined class. Not all of the steps described hereafter must be implemented in different specific embodiments.

Method 200 begins in a step 205, in which a class is provided, which hereinafter is referred to as a hypothesis, and which has to check as to whether present surroundings 105 of motor vehicle 110 fall into this class. In a subsequent step 210, the probability of the hypothesis being correct is set to a fixed value, which is between extreme values of the probability. For example, the probability may be between 0 (it is certain that the hypothesis does not apply) and 1 (it is certain that the hypothesis applies), a probability near 0.5 indicating that additional data are required to be able to assess whether the hypothesis is to be accepted or rejected.

In a subsequent step 215, surroundings 105 are sampled with the aid of sampling device 115. The resulting pieces of information are made accessible to device 100 via interface 120.

Figure 3:
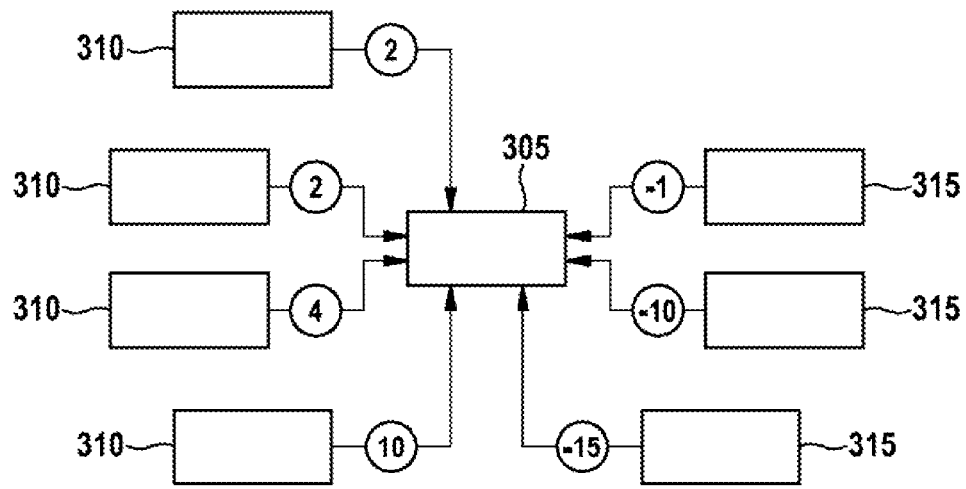
FIG. 3 shows an illustration of the determination of the probability in the method of FIG. 2.

In a step 220, one or multiple criteria are determined, which in each case indicate whether surroundings 105 could fall into the predetermined class, or more likely do not The criteria are described in greater detail hereafter with reference to FIG. 3. Although it is possible to determine and evaluate an arbitrary plurality of criteria based on the information of one or multiple sampling devices 115, it is assumed hereafter that only one criterion is involved.

In a subsequent step 225, the criterion is weighted with a constant factor. This factor is assigned to the criterion and may differ as a function of the predetermined class.

In one preferred specific embodiment, the determined criterion is subsequently also weighted with a dynamic factor. For this purpose, an uncertainty factor is determined in a step 230, which indicates by how much a previously determined probability that surroundings 105 are in the predetermined class differs from a value which is between the extremes, in particular a value of 0.5. An exemplary determination of uncertainty factor w may take place in the following manner:

$$w = \frac{1 - |p - 0.5|}{n} \qquad \text{(equation 1)}$$

Here, p is the latest determined probability that surroundings 105 are located in the predetermined class. The numerator of the formula of equation 1 thus has a maximal value if p=0.5 applies. The closer p is to 1 or 0, the smaller is also the numerator of equation 1. The more uncertain the past determination was, the greater is the influence granted to the criterion on a renewed determination of the probability.

If a plurality of criteria is processed, for example when using circular buffer 135 of FIG. 1, the described numerator may also be divided by the number n of processed criteria in order to determine w. In this case, cyclic storing of the respective latest determined criterion takes place in a step 240. If circular buffer 135 is not yet completely full, the determined criterion is stored at the next free memory location. Otherwise, the determined criterion overwrites the oldest, previously stored value in each case.

In a subsequent step 245, the determined criterion or criteria is/are processed in a Bayes filter. Bayes' theorem reads:

$$P(A \mid B) = \frac{P(B \mid A) \cdot P(A)}{P(B)} \qquad \text{(equation 2)}$$

where P(A|B) is the probability of A on condition B, P(A) is the probability of A, and P(B) is the probability of B.

In the present example, A is the hypothesis and B is the determined criterion. P(A|B) is thus the probability that the hypothesis should be accepted—and that surroundings 105 of motor vehicle 110 are in the predetermined class—on the condition that the criterion is present.

P(A) is the absolute probability that the hypothesis should be accepted; in the present example, this would be the absolute probability for driving on a freeway, for example. P(B) is the absolute probability of the criterion, for example, low transverse dynamics of motor vehicle 110. The absolute probabilities may be updated based on successful determinations of surroundings 105, whereby a learning effect of the Bayes filter may occur.

In a subsequent step 250, the probability value determined in step 245 replaces the previously determined or set value.

In an optional step 255, the new probability value may be compared to threshold values which implement a hysteresis of a statement with respect to the hypothesis. If the determined probability value is above an upper threshold value, for example, the hypothesis should be accepted. If the probability value is below a lower threshold value, the hypothesis should be rejected. In contrast, if the probability is between the two threshold values, a statement based on the present information or criteria is not yet conclusive.

In a final step 260, the determined probability or the determined statement is provided, for example with the aid of interface 125. Method 200 may subsequently return to step 215 and be carried out again.

FIG. 3 shows an illustration for determining the probability in the method of FIG. 2. A numerical value 305 is determined, which is used in step 245 of method 200 of FIG. 2 as criterion B (see equation 2).

Numerical value 305 is determined based on first criteria 310 and second criteria 315. First criteria 310, if they are met, in each case indicate that the hypothesis is correct. Second criteria 315, in contrast, indicate that the hypothesis is not correct.

For example, if the hypothesis is that surroundings 105 are to be assigned to the class of freeways, first criteria 310 may include a high speed, parallel traffic with the same direction, small average steering angles, or multiple marked traffic lanes. Second criteria 315, for example, may include high transverse dynamics, backing up, or first criteria 310 that fail to appear over a predetermined time.

First criteria 310 are deemed to be positive, and second criteria 315 are deemed to be negative, each criterion 310, 315 being assigned a fixed numerical value, which is indicated in a circle in each case by way of example. The numerical values of those criteria 310, 315 which were previously determined as being present are added up and form a sum which may be evaluated as numerical value 305 in step 245 of method 200. The sum may be updated periodically or each time a new criterion 210, 215 arrives.

Figure 4:
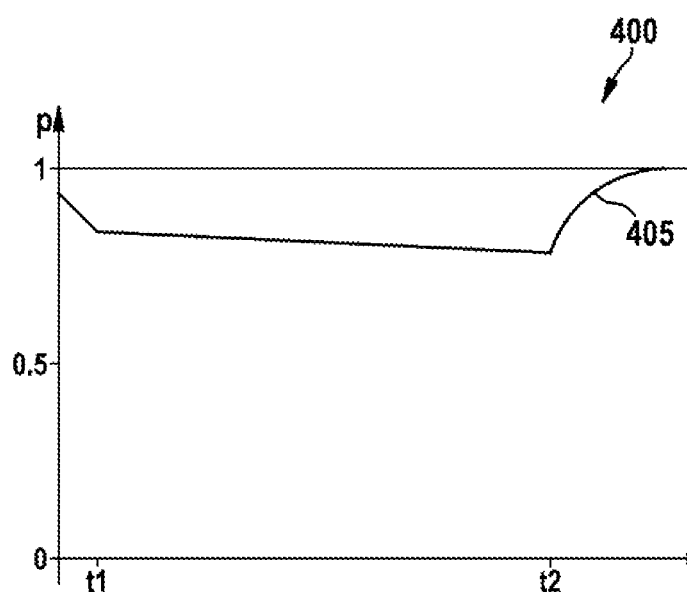
FIG. 4 shows a diagram of a decision curve of the method of FIG. 2.

FIG. 4 shows a diagram 400 of an exemplary decision curve 405 of method 200 of FIG. 2. A time is plotted in the horizontal direction, and a probability is plotted in the vertical direction.

Before a first point in time t1, determined probability p is high and drops relatively drastically since the criterion of high transverse dynamics was determined, which has a high negative weighting. Decision curve 405 drops more gently between points in time t1 and t2 since no first criteria 310 are determinable which increase probability p, and consequently a negative criterion having a low weighting is continuously applied. The gentle drop may also be due to a general absence of usable measured values. In such a case, determined probability p should in general always be deflected in the direction of uncertainty, i.e., for example, p=0.5, regardless of whether proceeding from a probability value close to 1 or one close to 0. After second point in time t2, decision curve 405 increases relatively steeply again since parallel traffic on a neighboring lane as the criterion was detected as first criterion 310.

The shown exemplary course of decision curve 405 corresponds to a specification of method 200 in which circular buffer 135 of FIG. 1 is used in order to take in each case a predetermined number of past criteria into consideration for determining the probability. The indicated, slightly logarithmic course of decision curve 405 on the other side of point in time t2 results in particular when taking dynamic uncertainty factor w into consideration, as was described above with reference to equation 1 and steps 230, 235 of method 200 of FIG. 2.

What is claimed is:

1. A method for classifying surroundings of a motor vehicle into one of multiple predefined classes, comprising:
   providing, by an estimating unit, a classification regarding one of multiple predefined classes to which the surroundings belong, the multiple predefined classes including at least two of a freeway class, a traffic-calm zone class, a city traffic zone class, or a parking situation class;
   receiving, via an interface unit, sampled pieces of information from the surroundings of the motor vehicle;
   determining, by a processing unit, based on the sampled pieces of information, at least one criterion which supports or weakens the classification;
   storing a plurality of determined criteria; and
   determining, by the processing unit, a probability of the classification being correct with the aid of Bayes filtering of the at least one criterion, the probability being determined based on the stored criteria.

2. The method as recited in claim 1, further comprising: accepting the classification if the probability exceeds an upper threshold value, and rejecting the classification if the probability is below a lower threshold value which is lower than the upper threshold value.

3. The method as recited in claim 2, wherein a distance between the upper threshold value and the lower threshold value is predetermined.

4. The method as recited in claim 2, further comprising: when the probability falls between the upper threshold value and the lower threshold value, one of:
indicating via a display unit that additional data is required to assess whether the classification should be accepted or rejected, and
continuing the determining, by the processing unit, the probability of the classification in the manner of a moving average including at least one past piece of information, the at least one past piece of information including data from within an interval of time relating to the sampled pieces of information.

5. The method as recited in claim 1, wherein each criterion relates to a point in time, and the criteria are cyclically stored based on respective reference points in time, so that the probability is determined with respect to a predetermined, past time period.

6. The method as recited in claim 5, wherein the number of the stored criteria is determined based on a speed of the motor vehicle.

7. The method as recited in claim 5, wherein a first weighting factor is assigned to each criterion.

8. The method as recited in claim 5, wherein the criteria are cyclically stored in a circular buffer in the motor vehicle.

9. The method as recited in claim 1, wherein the determination of each criterion includes a weighting with an uncertainty factor which increases as the latest determined probability increasingly moves away from extreme values.

10. The method as recited in claim 1, wherein the processing unit determines, based on the sampled pieces of information, at least two criterion which support or weaken the classification.

11. The method as recited in claim 1, wherein the processing unit determines a number of different classifications including the provided classification at a same time.

12. The method as recited in claim 1, wherein the multiple predefined classes including at least three of the freeway class, the traffic-calm zone class, the city traffic zone class, or the parking situation class.

13. The method as recited in claim 1, wherein the multiple predefined classes including all of the freeway class, the traffic-calm zone class, the city traffic zone class, and the parking situation class.

14. A non-transitory computer-readable data storage medium storing a computer program having program codes which, when executed on a computer, performs a method for classifying surroundings of a motor vehicle into one of multiple predefined classes, the method comprising:
providing, by an estimating unit, a classification regarding one of multiple predefined classes to which the surroundings belong, the multiple predefined classes including at least two of a freeway class, a traffic-calm zone class, a city traffic zone class, or a parking situation class;
receiving, via an interface unit, sampled pieces of information from the surroundings of the motor vehicle;
determining, by a processing unit, based on the sampled pieces of information, at least one criterion which supports or weakens the classification;
storing a plurality of determined criteria; and
determining, by the processing unit, a probability of the classification being correct with the aid of Bayes filtering of the at least one criterion, the probability being determined based on the stored criteria.

15. A device for classifying surroundings of a motor vehicle into one of multiple predefined classes, comprising:
an estimating device for providing a classification regarding one of multiple predefined classes to which the surroundings belong, the multiple predefined classes including at least two of a freeway class, a traffic-calm zone class, a city traffic zone class, or a parking situation class;
an interface for receiving sampled pieces of information from the surroundings of the motor vehicle;
a processing device for (i) determining, based on the sampled pieces of information, at least one criterion which supports or weakens the classification, and (ii) determining a probability of the classification being correct with the aid of Bayes filtering of the at least one criterion; and
a memory for storing the at least one criterion.

16. The device as recited in claim 15, wherein the memory is a circular buffer for cyclically storing the at least one criterion.

17. A method for indicating surroundings of a motor vehicle to a driver assistance system of the motor vehicle, comprising:
providing, by an estimating unit, a classification regarding one of multiple predefined classes to which the surroundings belong, the multiple predefined classes including at least two of a freeway class, a traffic-calm zone class, a city traffic zone class, or a parking situation class;
receiving, from a sampling device, sampled pieces of information from the surroundings of the motor vehicle;
determining, by a processing unit, based on the sampled pieces of information, at least one criterion which supports or weakens the classification;
determining, by the processing unit, a probability of the classification being correct with the aid of Bayes filtering of the at least one criterion;
accepting the classification if the probability exceeds a threshold; and
providing a signal indicating the surroundings of the motor vehicle to the driver assistance system of the motor vehicle.

18. The method as recited in claim 17, wherein in response to the classification being that the surroundings belong to the one of the multiple predefined classes corresponding to the freeway class, the at least one criterion includes at least one of: i) a high speed, parallel traffic with a same direction of travel, ii) small average steering angles, or iii) multiple marked traffic lanes.

19. The method as recited in claim 18, wherein the at least one criterion includes the high speed, parallel traffic with the same direction of travel.

20. The method as recited in claim 18, wherein the at least one criterion includes small average steering angles.

21. The method as recited in claim 18, wherein the at least one criterion includes the multiple marked traffic lanes.

22. The method as recited in claim 17, wherein the sampling device includes at least one of a camera, a distance sensor and a position sensor.

\* \* \* \* \*